March 27, 1962 P. J. BRUNO 3,026,742
LOCKING DEVICE FOR REMOVABLE HANDLES
Filed Aug. 1, 1960

INVENTOR.
PATRICK J. BRUNO
BY
Kane, Dalsimer and Kane
Attorneys

United States Patent Office 3,026,742
Patented Mar. 27, 1962

3,026,742
LOCKING DEVICE FOR REMOVABLE HANDLES
Patrick J. Bruno, Albany, N.Y., assignor to Albany Machine Tool Corporation, Albany, N.Y., a corporation of New York
Filed Aug. 1, 1960, Ser. No. 46,467
4 Claims. (Cl. 74—548)

This invention has to do with locking devices for removable handles, having particular reference to a form of grip lock device for such a handle with an opening therethrough to engage a stem member of, for example, a fluid valve, and the provision of such a device with such a handle and a stem adapted therefor is the principal object of the invention.

While the particular invention herein described and claimed generally has to do with removable handles adapted to engage members to rotate the same, it is particularly adaptable to fluid valves wherein such handles may removably be fitted to stem members. It is well known that often such valves are placed in a position where they are readily accessible to anyone who mischievously, or otherwise, can turn them off or on contrary to the intent of those who have supervision of such valves in whatever capacity they may be employed.

Conventionally, such valve stems terminate in a squared end and the hole through the handle is likewise squared readily to engage such a stem. Furthermore, most such squared end portions are drilled and tapped to receive a screw and cap member to hold such a handle in position. Depending on whether the valve stem is turned to an "On" or "Off" position, and it is intended to be kept in such selected position, it is, of course, obvious that by removing the screw the handle likewise can be removed so that the valve stem cannot readily be turned thereafter without some proper tool or instrument. However, it is also obvious that this is time-consuming, that the fastening parts could become lost more readily than the handle, and that constantly to do this with would be a nuisance.

It has long been felt that it would be a distinct improvement if quickly engageable and removable handles could be provided and this has now been accomplished by means of the present invention.

Generally, it is an object of the invention to provide such a device that is economical of manufacture, simple, yet sturdy and durable of construction, positive in action and which will operate with freedom from wear and tear and other mechanical difficulties, and is otherwise well suited for the purposes for which it is intended.

More specifically, it is an object of the invention to provide a grip-lock device which comprises a first section adapted to be anchored to the handle adjacent the opening or aperture therein, and a second section comprising a resilient jaw adapted to extend beyond the opening and to grip the stem adjacent the handle when the latter engages the same but automatically releases the stem when the handle is pulled therefrom.

It is also an object of the invention to provide such a device which can be permanently assembled with such a handle after the same has been prepared therefor, or to anchor the same therein when such a handle is cast from metal, or otherwise to embed such a grip-lock device when the handle is made of plastic by embedding the same therein when such handles are formed.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which.

Figure 1:
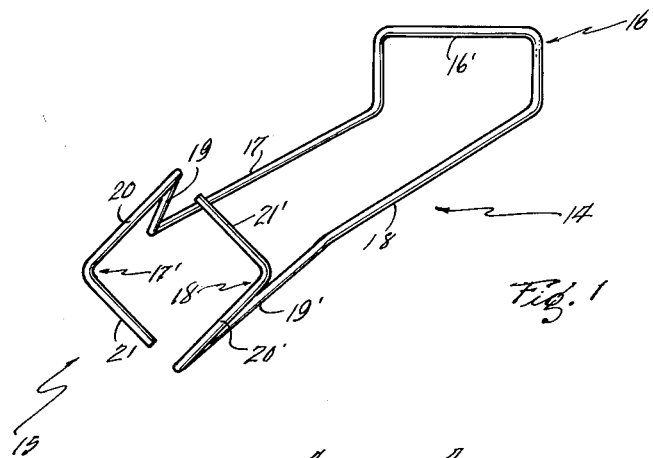
FIG. 1 is a perspective view, substantially enlarged, of a preferred embodiment of the invention.
Figure 2:
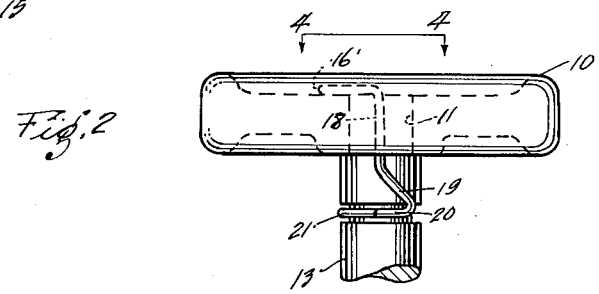
FIG. 2 is an elevational view showing a device such as that depicted in FIG. 1 secured to a handle and valve stem.
Figure 3:
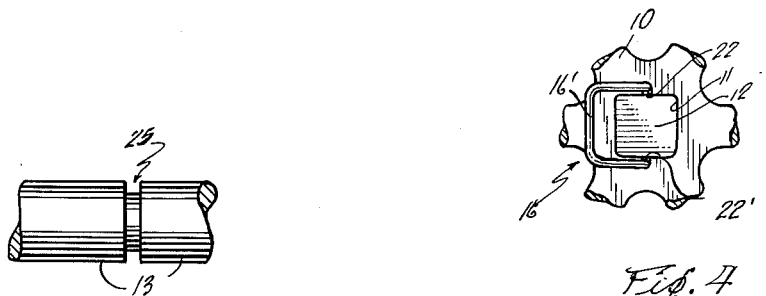
FIG. 3 is a fragmentary portion of such a valve stem showing the latching area thereof.
Figure 4:
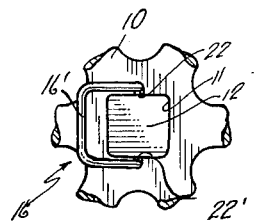
FIG. 4 is a view looking down from the central portion of FIG. 2.

Referring more particularly to the drawing, there is shown in FIG. 1 a preferred form of grip-lock device for a removable handle 10 having an opening 11 therethrough which preferably is squared to engage a square portion or grip surface 12 of a stem member 13.

The grip-lock device comprises a first section indicated generally at 14 whereby to anchor the same to the handle 10, and a second portion indicated generally at 15 comprising a resilient jaw adapted to extend beyond the opening 11 in the handle 10 and to grip the stem member 13 adjacent the handle when the latter engages the stem but automatically releases the stem when the handle is pulled therefrom.

More specifically, it will be seen that the grip-lock of FIG. 1 is formed from a single length of metal that has been permanently bent from a straight bar or rod into the sections 14 and 15 as well as a third section indicated generally at 16.

Beginning with the first section 14 it will be seen that the same comprises two straight parallel spaced-apart portions 17 and 18 which, together with the third section 16 before the latter is bent at an angle as shown in the drawing, form a generally U-shape.

The third section 15 composing the jaws appears as two similar opposed hook portions indicated generally at 17' and 18', respectively, extending integrally from the straight parallel portions 17 and 18. These two opposed jaw portions or hooks, it should be noted, are formed by bending, for example, the portion 19 at an angle in the form of a "dog-leg," then bending another portion 20 thereof back upon itself and the remaining portion 21 at right angles thereto. Similarly, the corresponding portions extending from the straight section 18, namely, 19', 20' and 21', are likewise formed. Thereafter each said hook portion is twisted around the axis of each straight section 17 and 18 through approximately 45°. This can be observed from the fact that the opposite straight sides 20 and 21' are not parallel to the straight section 16' of the section 16. In other words, by so twisting the jaw portions, the diameters across the sections 21, 21', and 20, 20' become less than the diameter of the stem 13 thereby enhancing the gripping effect of the jaws indicated by the second section 15.

In the drawing it will be seen that the handle 10 has two oppositely disposed parallel grooves 22 and 22' adjacent the opening 11. Into these grooves are inserted the straight portions 17 and 18 to anchor the same and, by bending over the section 16 at right angles thereto against the top of the handle 10, the grip-lock will be firmly anchored and seated in position. In the meantime, the sections 15 will extend beyond the opening 11, or bottom of the handle 10, to grip the stem member 13 adjacent the handle when the latter engages the stem but automatically releasing the stem when the handle is pulled therefrom.

In order to enchance the locking effect, the stem may be supplied with any suitable form of latching means for the opposed jaw sections 15 and preferably for the purpose I provide an annular groove or ring indicated generally at 25 in which the constructed diameter of the members 17' and 18' will snap into seated position but be readily unlatched therefrom when the handle is pulled out of engagement with the square end of the stem.

It will thus be seen that the objects hereinbefore set forth may readily and efficiently be obtained and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

I claim:

1. A coupling device for use in connecting a rotatable stem member having, a grip surface formed at the end of said stem member and a non-circular outline with, a handle member having, a central opening formed therein to receive said grip surface and having a configuration complementary thereto, said coupling device comprising a resilient wire of circular cross-section folded upon itself to form a fastener member, a first section of said fastener member extending through said central opening between said handle member and said grip surface, a portion of said first section anchored to said handle member, a first end of said fastener member forming a right angle, a second end of said fastener member forming a second right angle, a resilient jaw formed by said first and second ends disposed opposite to each other and resiliently urged toward one another, said resilient jaw extending beyond said handle member and resiliently gripping said stem member in a zone adjacent said handle member.

2. The combination in accordance with claim 1 in which the distance between the first and second end of the fastener member forming the resilient jaw is normally less than the stem diameter.

3. A device as defined in claim 1, and further characterized in that said first section comprises two parallel spaced apart portions of equal length.

4. A device as set forth in claim 3, and wherein said parallel portions are connected by a third section adapted to be clinched over to seat against the handle adjacent said opening on the side opposite from which said first and second ends extend.

References Cited in the file of this patent

UNITED STATES PATENTS

| | | |
|---|---|---|
| 2,621,947 | Markvart | Dec. 16, 1952 |
| 2,634,992 | Nelson | Apr. 14, 1953 |
| 2,643,903 | Nathan | June 30, 1953 |
| 2,972,493 | Waters | Feb. 21, 1961 |

FOREIGN PATENTS

| | | |
|---|---|---|
| 1,114,122 | France | Dec. 12, 1955 |